United States Patent [19]

Bell, Jr. et al.

[11] 4,134,000
[45] Jan. 9, 1979

[54] PROTECTION CIRCUIT FOR ELECTRICAL DISCHARGE MACHINING POWER SUPPLY APPARATUS

[75] Inventors: Oliver A. Bell, Jr., Statesville; Randall C. Gilleland, Troutman; Jeter O. Barker, Durham, all of N.C.

[73] Assignee: Colt Industries Operating Corp., New York, N.Y.

[21] Appl. No.: 757,977

[22] Filed: Jan. 10, 1977

[51] Int. Cl.² .............................................. B23P 1/08
[52] U.S. Cl. ................................................... 219/69 C
[58] Field of Search ................. 219/69 S, 69 C, 69 M, 219/69 P

[56] References Cited

U.S. PATENT DOCUMENTS

| 3,732,392 | 5/1973 | Verner | 219/69 S |
| 3,746,826 | 7/1973 | Bell | 219/69 S |
| 3,751,622 | 8/1973 | Bell | 219/69 S |
| 3,851,134 | 11/1971 | Takarada | 219/69 S |

Primary Examiner—Bruce A. Reynolds
Attorney, Agent, or Firm—Harry R. Dumont

[57] ABSTRACT

A protection circuit which senses and responds to an output transistor failure to provide appropriate power interruption to protect an electrical discharge machining apparatus. The circuit receives an input of either standard or reverse polarity from the gap. This signal is passed through a comparator stage where it is compared with a preset voltage level. Further inputs are provided in accordance with the polarity setting and from the multivibrator in such manner that an appropriate phase relationship is maintained depending on the preset polarity. A control signal is then generated to control a transistor switching device with an interrupt signal thus being furnished to turn-off the power supply. Also included in a different embodiment of the invention is a system whereby, in a multiple gap output module power supply, responsive to failure of an output transistor in any one of the output modules, the entire power supply is cut off.

5 Claims, 3 Drawing Figures

PROTECTION CIRCUIT FOR ELECTRICAL DISCHARGE MACHINING POWER SUPPLY APPARATUS

BACKGROUND OF THE INVENTION

Systems are known in the electrical discharge machining art in which electrical parameters are responded to when these are of an abnormal level to provide interruption of the power supply particularly in response to failure of output electronic switches in the power supply. The present invention is related to an embodiment of an EDM power supply in which the output switches are transistors although it is equally applicable to any precision type EDM power supply in which electronic switches are used to provide machining power pulses to the machining gap. By "electronic switch" we mean any electronic control device having a plurality of electrodes including at least two principal or power conducting electrodes acting to control current flow in the power circuit, the conductivity of the power circuit being controlled by a control electrode within the switch so the conductivity of the power circuit is statically or electrically without the movement of any mechanical elements within the switch. Included within the definition by way of illustration but not limitation are electronic tubes, transistors, semi-conductor controlled rectifiers and the like.

Various prior art systems have been developed to provide for interruption of machining current responsive to output transistor failure, which failure normally occurs in a shorted condition between the principal or power conducting electrodes of the output transistor. One example of such a protection circuit is disclosed and claimed in Robert S. Webb U.S. Pat. No. 3,257,580 issued on June 21, 1966 for "Fault Detection and Cut-Off Circuit for Electrical Discharge Machining Apparatus", which patent is of common ownership with the present application. The system described in that patent relates to a fault detection sensing which occurs during the machining power pulse off-time across the principal electrodes of the output switch and is thus operable during machining pulse off-time. A further example of the transistor failure cut-off detection circuit is also shown in Kurt H. Sennowitz U.S. Pat. No. 3,524,037 issued on Aug. 11, 1970 for "Fail Transistor Protective Circuit For Electrical Discharge Machining Apparatus", in which drive voltage level is sensed and a signal stage with cut-off switch is used to initiate relay interruption of the power supply.

An additional system for protecting against output transistor failure is shown and described in Oliver A. Bell, Jr. U.S. Pat. No. 3,751,622 issued on Aug. 7, 1973 for "Protection Circuit For Electrical Discharge Machining Power Supply Apparatus". In that patent which likewise is of common ownership herewith, the protection circuit senses drive voltage for the electronic output switch and uses a field effect transistor to initiate interruption of the power supply when output transistor failure occurs.

A still further system for protecting an EDM power supply system against damage resultant from output transistor failure is shown in Oliver A. Bell, Jr. U.S. Pat. No. 3,825,713 issued on July 23, 1974 for "Function Control Circuit for EDM Power Supply". In that patent, magnitude of current flow through a resistor in series with the output transistor principal electrode is sensed by means of a light emitting device and in that way a control signal for interrupting the power supply is generated. Bell U.S. Pat. No. 3,825,713 is likewise of common ownership with the present application.

SUMMARY OF THE INVENTION

The prior art particularly as described above has offered a number of alternative approaches to handling the problem of output transistor failure in electrical discharge machining power supplies. It will be understood that when the output transistor fails with its electrodes in the shorted condition, this results in a continuous discharge across the gap. This continuous discharge does not permit transfer point to point on the workpiece as is required for normal machining. The transistor short circuiting can be partial or complete and can arise from internal damage from runaway, high voltage transients or from other circuit mal-functions. Prolongation of this condition can cause damage to both electrode and workpiece. A further complication arising in providing a protection circuit for this type of failure is that it is necessary in electrical discharge machining to have a capability of changing gap polarity as different workpiece and electrode material combinations are used. The polarity known as "standard" is that in which the electrode is negative and the workpiece positive. The opposite polarity known as "reverse" polarity is that in which the electrode is positive and the workpiece negative. The present invention will seem to afford an improved method of sensing for transistor failure independent of which polarity of the gap has been preset. The sensing may be done by a sensing line connected to the gap and to the output transistor power electrode terminal.

It will further be seen that the protection circuit in accordance with the present invention is one which is reliable, rapid acting and particularly adaptable to systems in which there are more than one output module and more than one machining gap. With modern electrical discharge machining technology, it is possible to have a single, independent generator such as a multivibrator or oscillator which triggers a number of different output modules, each having a capability for example of the order of 15 to 25 amperes so that, at the same time, cutting can be carried on with a number of electrodes cutting on a common workpiece or by a number of electrodes, each cutting on a different workpiece.

BRIEF DESCRIPTION OF DRAWINGS

The present invention, its operational features and its advantages and advancements will be understood from the following specification together with the drawings in which like numerals are used to refer to identical parts where they occur, and wherein.

DETAILED DESCRIPTION OF THE PREFERRED EMBODIMENT

Figure 1:
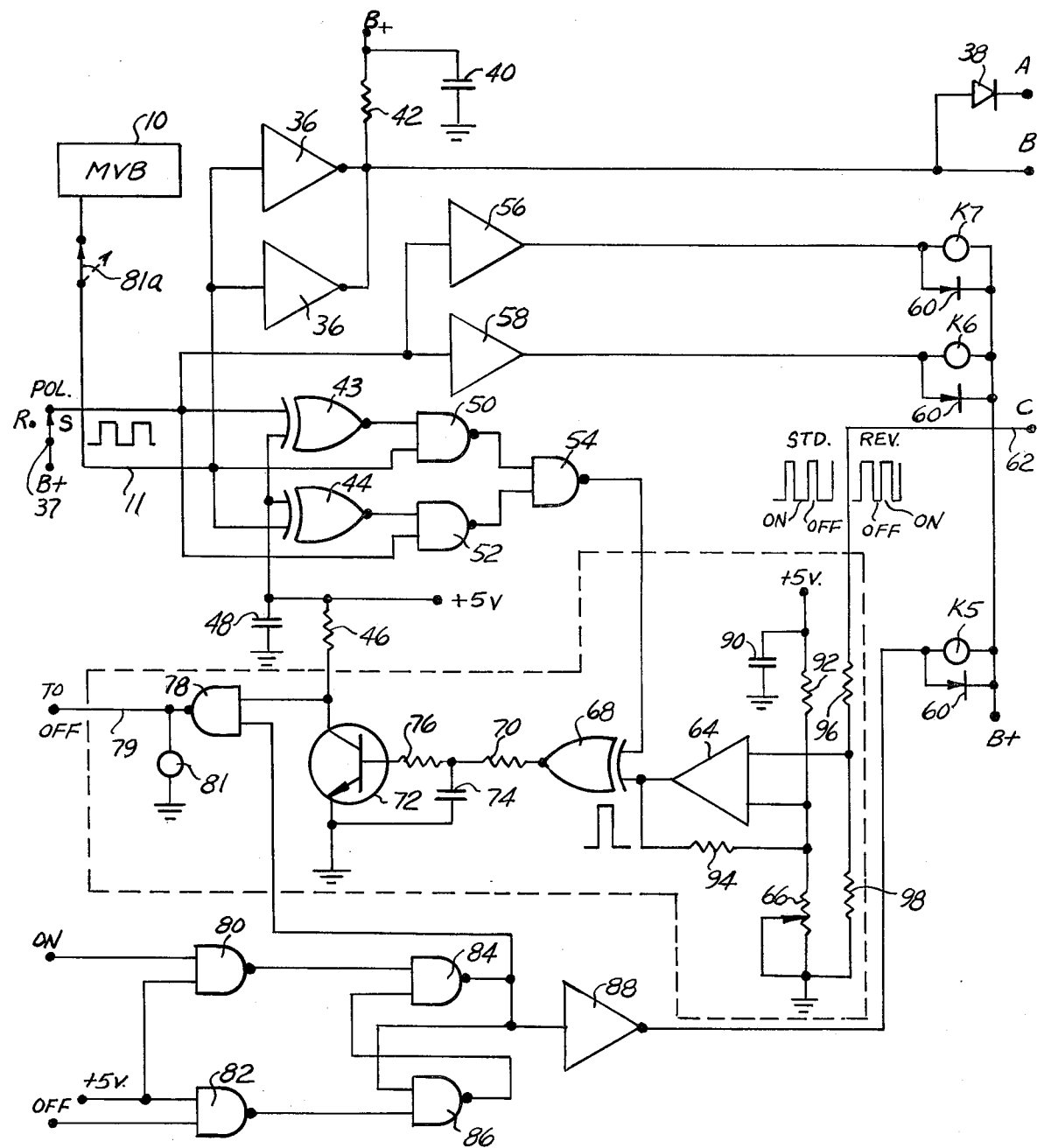
FIG. 1 is a combined schematic and block diagramatic showing of an output transistor failure protection circuit used in connection with an EDM power supply.
Figure 2:
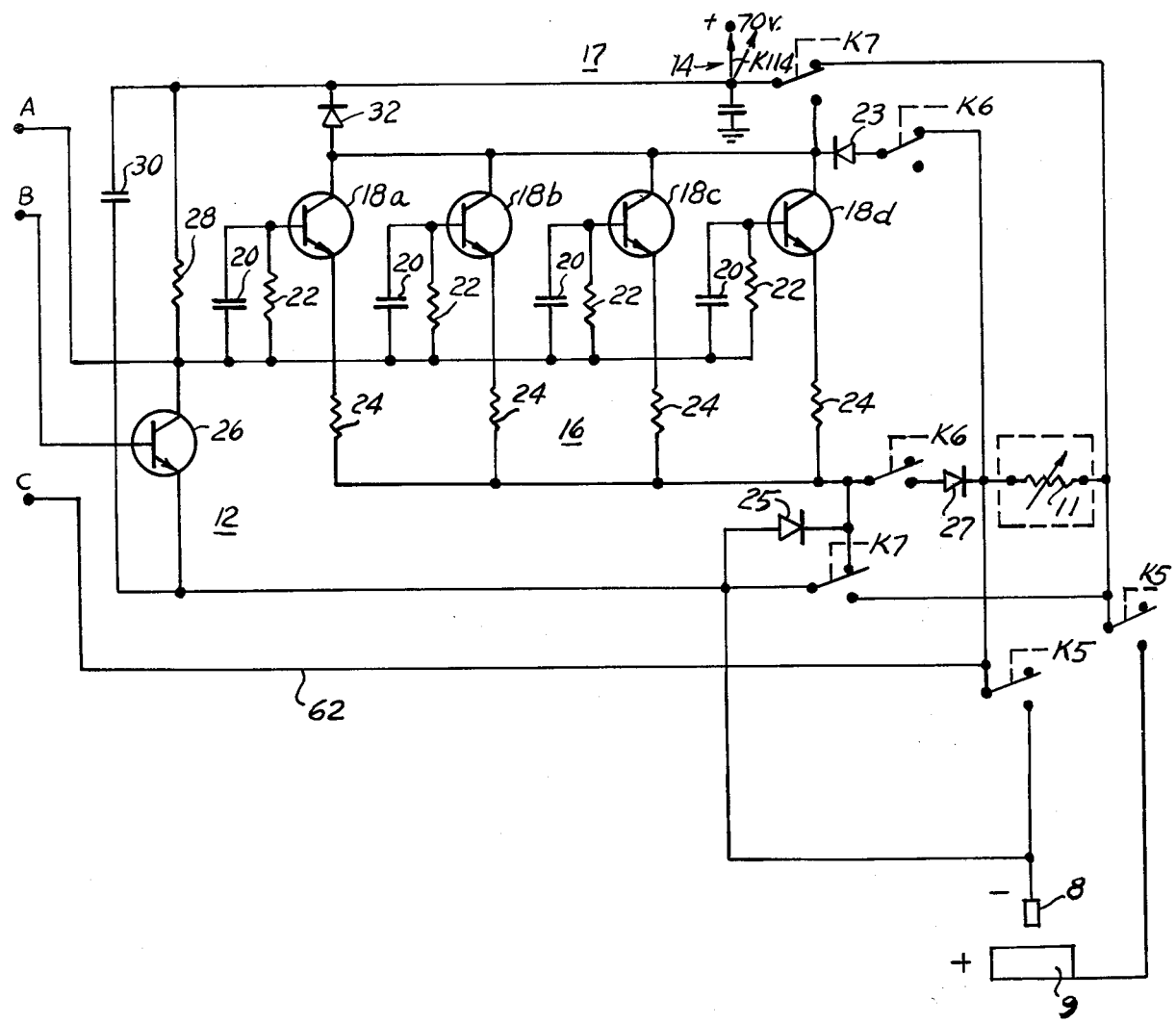
FIG. 2 is a schematic drawing showing the output module and gap circuit for the EDM power supply shown in part in FIG. 1.
Figure 3:
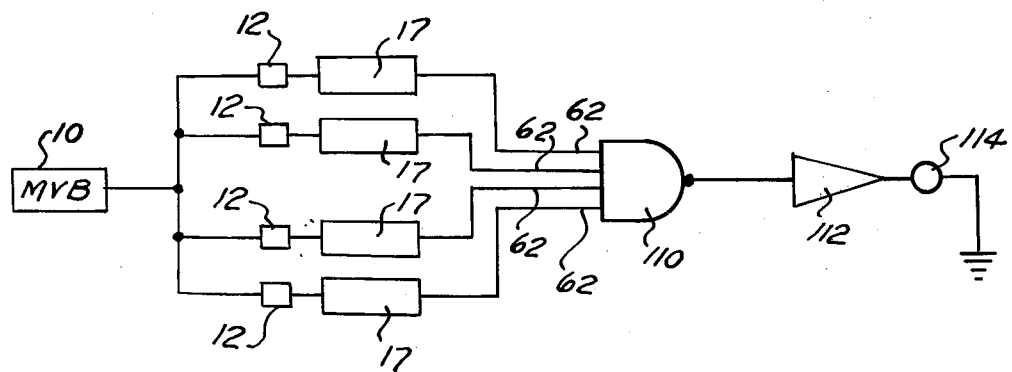
FIG. 3 is a block diagramatic representation of a multiple output module power supply in which the present invention is suitable for incorporation.

FIGS. 1 and 2 show the basic parts of an electrical discharge machining power supply which include a multivibrator 10, a drive stage 12, a main machining power source 14, which may be of the order of 70 volts and an output module 17, including a bank 16 of electronic output transistors comprising transistors 18a, b, c and d. In FIGS. 1 and 2 there is shown a single output module and a single gap set up. It will be understood that the output of the multivibrator 10 may be used to trigger at the same time a number of output modules 17, particularly as shown in FIG. 3 hereinafter. Each of the transistors 18a–d has attached to it a signal input RC network including a capacitor 20, and resistor 22. A plurality of resistors 24, are shown, each connected in series with the emitter of its respective output transistor. The intermediate drive stage 12, includes a transistor 26 having a resistor 28 connected between its collector and a B + source and a capacitor 30 as shown. There is also a diode 32 connected between the plus terminal of the main power source 14 and the respective collectors of the transistors 18a–d.

It will be understood that the multivibrator 10 may be embodied as a free running multivibrator as shown and described in the aforementioned U.S. Pat. No. 3,825,713 or as a digitally controlled pulse generator such as is shown in Oliver A. Bell U.S. Pat. No. 3,809,848 issued on May 7, 1974 for "Digitally Controlled Power Supply For Electrical Discharge Machining Apparatus".

The basic elements of the output transistor failure protection circuit are enclosed in FIG. 1, in a dash-line box. The several different inputs to the system are shown at the left hand side of the drawing. These include the pulse input from the multivibrator 10 introduced in lead 11.

This pulse input is first passed through a pair of inverter gates 26, thence through a diode 38 and through terminals A and B to provide triggering pulses to the drive stage transistor 26 in the drive stage 12 of FIG. 2. The transistor 26 then controls the conduction of the output transistors 18a–d of the output module 17 so that machining power pulses are passed across the machining gap between the electrode 8 and the workpiece 9. As well known in the electrical discharge machining art, the machining power pulses are readily controllable with respect to their on-off time by the multivibrator 10. Also, the machining power pulses may be controlled with respect to their current magnitude by the inclusion in the gap circuit of one or more variable resistors 11 as shown in FIG. 2. Each of the output transistors 18a–d of the output bank 16 further has associated with it an emitter series resistor 24. Diodes 23, 25 and 27 are included in the gap circuit and are switchable into the gap circuit as shown so that the polarity of the gap leads may be varied according to the requirements of the particular EDM operation being carried out. The several necessary gap lead connections are controlled by the operation of relays K6 and K7 and their respective movable contacts as will be more fully explained hereinafter.

Now further with reference to FIG. 1, the pulse output from the multivibrator 10 is also provided as an input to an exclusive nor gate 44 which is one of the pair of exclusive nor gates 43 and 44. It is further provided as an input to the uppermost of the next following pair of dual input nand gates 50 and 52. These in turn have their respective outputs connected to the input terminals of a dual input nand gate 54. A further input to the protection circuit is provided at the left hand side of FIG. 1, such input bearing the letters "POL" representative of the polarity setting of the EDM power supply is provided from a B + voltage source, first as the upper terminal of the exclusive nor gate 43 and second, as the input to a pair of amplifiers 56 and 58. The amplifiers 56 and 58 are connected respectively to the coils of the pair of relays K7 and K6 which through their operation control the gap lead connections to provide either standard or reverse polarity. As will be seen from FIG. 1, in the standard polarity position "S" both relays K6 and K7 will be energized and their associated relay contacts as shown in FIG. 2 will be placed in the several positions shown to provide a standard gap polarity whereby the electrode 8 is maintained negative relative to the workpiece 9. Each of the relay coils K6 and K7 is shunted by a diode 60 poled in the manner shown.

It will further be seen that the lower input terminal of the exclusive nor gate 43 and the upper input terminal of the exclusive nor gate 44 are both connected to an external RC timing network including a capacitor 48 and a resistor 46 with a B + voltage source connected in circuit as shown.

Also shown in FIG. 1 is the return terminal C which is coupled to the return line 62 of FIG. 2 and represents a gap voltage sensing circuit with two alternate pulse inputs shown in wave-form representation with notation as "STD" or "REV". The gap voltage signal sensed through the lead 62 is representative of voltage levels occurring at the emitters of the four output transistors 18a–d and of course, also represents the excursions of gap voltage. The sensed gap voltage signal is provided as the input to the upper terminal of a voltage comparator 64. A second input at its lower input terminal is of a voltage level preset by an adjustable potentiometer 66.

The next following stage in the logic circuit is an exclusive nor stage 68 which has its upper terminal connected to the output of the nand gate 54 and its lower terminal connected to the output from the comparator 64. The output from the exclusive nor circuit 68 is then passed through a first series resistor 70 and a second series resistor 76 to the base of a transistor 72. A capacitor 74 is connected in circuit as illustrated. The next following stage, nand gate 78 has its upper input terminal connected to the collector of the transistor 72 and receives a further on-off input to its lower input terminal which input will be clarified hereinafter.

The output from the nand gate 78 is passed through a lead 79 to provide a control signal to a terminal further identified by the designation "OFF" at the lower left hand side of the FIG. 1 drawing. The comparator 64 further includes a series resistor 96 connected between it and the variable resistor of potentiometer 66. The lower and upper terminals of the comparator 64 are shunted by a resistor 94. A positive DC bias and an external timing network including capacitor 90 and resistor 92 are also connected to the lower input terminal of the comparator 64.

The lowermost two input terminals on the left hand side of FIG. 1 are those designated as "ON" and "OFF". The "ON" input terminal represents a signal normally provided by depression or closure of a cycle start switch in a manner well known to the art. The "ON" signal is provided as the input to the upper input terminal of a nand gate 80 while the "OFF" signal is provided as the input to the lower input terminal of a nand gate 82. The respective outputs of the nand gates 80 and 82 are passed to input terminals of the next following nand gate stages 84 and 86 as illustrated. Gates 84 and 86 have their final outputs connected to a inverter gate 88. In accordance with the level of the output of the inverter gate 88 a following relay K5 which represents the "ON" control relay K5 and its contacts as further shown in FIG. 2 is energized. The relay K5 like relays K6 and K7 is shunted by a diode 60 as shown. The common operating voltage for the three relays K5, K6 and K7 as shown is a B + voltage source.

The operative relationship between the various above described logic stages will be clarified and further expanded in the section "Description of Operation" hereinafter. In each case, the sets of contacts associated with the relays K5, K6 and K7 are all appropriately lettered in the FIG. 2 drawing so that the various connections can be readily determined.

FIG. 3 shows in block diagrammatic form the manner in which a single multivibrator 10 is used to trigger the operation of four output modules 17 so that, if there is a failure of one or more of the output transistors 18a-d in any of the output modules 17 there is then provided a control signal which will interrupt in a timely fashion the operation of the power supply. A four input nand gate 110 is thus connected to the four associated sensing lines 62. If any one of the four lines goes low, the output of the nand gate 110 will go high. The output is passed through an amplifier stage 112 and used to actuate a control relay 114. A normally closed contact K114 in series with the main power supply then will open the line of the main operating voltage supply 14 and terminate operation of the EDM power supply.

DESCRIPTION OF OPERATION

In the normal operation of the EDM power supply, the cycle of operation is begun by depressing a cycle start button and providing a signal to the terminal labeled "ON" of FIG. 1. This will provide a change of state to the several gating stages 80 and 84 and the inverter amplifier 88 to actuate the relay K5 and thus connect the DC power source to the gap leads by closure of the two contacts K5 of FIG. 2. At the same time, the multivibrator 10 is provided with an operating voltage in a manner well known in the art so that the pulse output on line 11 commences. This provides a triggering pulse train through the terminals A and B which in turn operates the drive transistor 26 and the output transistor bank 16 so that machining power pulses are passed across the machining gap between the electrode 8 and the workpiece 9. The polarity of the gap elements has been preset to a standard or "S" condition through the placement of the polarity switch 37 shown at the left hand side of FIG. 1. With both relays K6 and K7 energized, a standard polarity connection to the gap is completed in a manner illustrated in FIG. 2. On the other hand, if the polarity switch 37 of FIG. 1 is placed in the "R" position, the opposite positioning of the contacts controlled K6 and K7 will change the polarity of the gap elements to that known as reverse.

FIG. 1 also shows the wave-form of pulses fed back through sensing lead 62 to the upper terminal of the comparator 64. For standard and reverse polarity, the two different phase input pulses are illustrated in FIG. 1. The magnitude of voltage of the input signals on line 62 is compared in the comparator 64 to a reference voltage preset by the setting of the potentiometer 66. The exclusive nor gate 68 is controlled in its operation by the output of the nand gate 54. Depending on which polarity has been preset for the machining operation, the exclusive nor gate 68 will either pass or not pass a signal of a magnitude sufficient to turn-off the following transistor 72. It will be understood that the transistor 72 is normally in a conductive condition. When it is turned off as a result of a drop of voltage level on line 62 to a level indicating transistor failure then there will be provided an "OFF" signal through the lead 79 which can be used to interrupt the operation of the power supply circuit. This can be done in the manner indicated in FIG. 1 by providing the output signal from the off line 70 as an input to the lowermost "OFF" terminal at the left hand side of FIG. 1 to de-energize the coil K5 thus interrupting the power supply operation. Alternately, the high output from nand gate 78 may be used to operate the relay 81 and thus by opening a normally closed contact 81a will interrupt the pulse output from the multivibrator 10.

It will thus be seen that by our invention we have provided an improved protection circuit for providing interruption of the EDM power supply by interrupting the output from the multivibrator or by disconnection of the machining power source responsive to failure of one or more of the output switches or transistors. This is achieved by sensing the gap voltage and providing a pulse output to a comparator which is compared with a preset reference voltage. When the output reaches a sufficiently low level as compared to the reference voltage, there is then provided through an exclusive nor stage a turn-off signal which provides the protective operation. The system further includes a switching transistor which finally provides a disconnect operation through operation of one or more relays. The system includes a further pair of inputs which represent the polarity preset by a polarity selection switch and an input from the multivibrator so that for either polarity of gap as it is preset, there is provided a phasing for a proper comparison in the comparator stage. Otherwise stated, the transistor fail protection circuit is one which works with equal reliability and speed for either connection of gap polarity.

We claim:
1. In an apparatus for machining a conductive workpiece by means of intermittent electrical discharge across an EDM gap between a tool electrode and the workpiece with reversible polarity;
   a source of machining power;
   an electronic switch having a pair of power conducting electrodes;
   said power conducting electrodes connected between said source and said gap;
   a pulser operably associated with said switch for turning it "on" and "off", wherein the improvement comprises a system for cutting off the apparatus in response to failure of said switch comprising;
   a sensing lead connecting to the gap for providing a signal representative of gap voltage;
   a reference voltage source;
   a comparator stage having an output terminal and a pair of input terminals;
   one such input terminal connected to the sensing lead and the other input terminal connected to the reference voltage source;
   a disconnect means operably connected to said machining power source for interrupting power from said machining power source to said gap;
   a switching means having its control electrode operably connected to the output of said comparator for providing operation of said disconnect means responsive to change of said gap voltage below the level of said reference voltage source; and a gating means connected intermediate said comparator and said disconnect means for allowing passage of either polarity of gap voltage signal, said gating means comprising an exclusive nor gate.

2. The combination as set forth in claim 1 wherein said exclusive nor gate includes one input terminal connected to the output of said comparator and the other input terminal operably connected to the output of a polarity selector device.

3. The combination as set forth in claim 2 wherein said polarity selector device comprises a two position manual switch and a plurality of relays operably connected to and controlling the connection of said source to said gap for reverse and standard polarity in response to the setting of said manual switch.

4. A protection system for an EDM power supply apparatus for machining a workpiece by a tool electrode across a dielectric coolant-filed gap including a machining power source;
- a polarity selection means for connecting said source to said gap in standard and in reverse polarity;
- a multivibrator;
- an electronic switch having a control electrode and a pair of power conducting electrodes;
- said control electrode connected to the output of said multivibrator for turning said switch on and off;
- said power conducting electrodes operably connected between said source and said gap;
- means for sensing gap voltage;
- a reference voltage source;
- a comparator coupled to said gap voltage sensing means and said reference voltage source for comparing them and providing a control output responsive to predetermined difference therebetween;
- a disconnect means coupled to said control output for interrupting the output of said multivibrator responsive to said difference;
- a gating means operably connected between said comparator and said disconnect means;
- and means operably connected to said polarity selection means for enabling the operation of said gating means in either condition of said polarity selection means; said gating means comprising an exclusive nor gate having one input terminal operatively connected to the polarity selection means and the other input terminal connected to the output of said comparator.

5. The combination as set forth in claim 4 wherein said disconnect means includes an electronic cut-off switch and a relay, said cut-off switch controlled in its conduction by the output of said exclusive nor gate, said relay operably connected to the output of said cut-off switch and having a movable contact connected in the output lead from said multivibrator.

* * * * *